UNITED STATES PATENT OFFICE.

GEORGE WEGENER, OF MISKOLCZ, AUSTRIA-HUNGARY.

COMPOSITION FOR PREVENTING SCALE IN BOILERS.

No. 911,928.　　　Specification of Letters Patent.　　　Patented Feb. 9, 1909.

Application filed February 8, 1908. Serial No. 414,979.

*To all whom it may concern:*

Be it known that I, GEORGE WEGENER, manufacturer, citizen of the Kingdom of Hungary, and resident of 16 Rákóczi utca, Miskolcz, in the county of Borsod and Empire of Austria-Hungary, have invented a certain new and useful Composition for Preventing the Formation of Scale in Steam-Boilers, of which the following is a specification.

This invention relates to the manufacture of an improved composition for preventing the formation of scale in steam boilers. After a long series of experiments I have found that, for the prevention of a deposit on the inside of the boiler and separation or precipitation of the constituents causing the hardness of the boiler feed-water, a mixture of terra cutch with tannin, quercetin and a little borax is the most advantageous.

The substances forming the composition are mixed with a sufficient amount of boiling water to form a pasty or dough-like mixture and brought into the market in suitable receptacles or vessels, it being introduced into the boiler with the feed water.

For making the mixture, the following example of proportions is advantageous:

Terra cutch ___ 70 parts by weight.
Tannin _____ 15 　"　　　"
Quercetin ____ 10 　"　　　"
Borax _____ 5 　"　　　"

What I claim is:

1. The herein-described composition of matter consisting of water, terra-cutch, tannin, quercetin, and borax, substantially as described and for the purpose specified.

2. The herein-described composition of matter for preventing the formation of scale in steam boilers, consisting of seventy parts by weight of terra-cutch, fifteen parts by weight of tannin, ten parts by weight of quercetin, five parts by weight of borax, and water sufficient to form a dough-like mixture of said component parts, substantially as described.

Signed at Budapest, Hungary, this eighteenth day of January A. D. 1908.

GEORGE WEGENER.

Witnesses:
　LADISLAUS TÖRÖK,
　T. A. ZSATEOVICH.